United States Patent [19]

Harrison

[11] 4,282,816
[45] Aug. 11, 1981

[54] ELASTOMERIC RAILWAY SUSPENSION

[75] Inventor: Reginald Harrison, Leicestershire, England

[73] Assignee: Dunlop Limited, London, England

[21] Appl. No.: 44,357

[22] Filed: May 31, 1979

[30] Foreign Application Priority Data

Jun. 10, 1978 [GB] United Kingdom ............... 26666/78

[51] Int. Cl.³ ........................... B61F 5/30; B61F 5/38; B61F 5/50
[52] U.S. Cl. ............................. 105/224.1; 105/197 A; 267/63 A
[58] Field of Search ............ 105/224 R, 224.1, 197 A, 105/224.1; 267/63 A

[56] References Cited

U.S. PATENT DOCUMENTS

| 3,575,403 | 4/1969 | Hamel et al. | 105/224.1 |
| 3,680,888 | 8/1972 | Hirst | 105/224.1 X |
| 3,830,483 | 8/1974 | Gaydecki | 105/224.1 X |
| 3,920,231 | 11/1975 | Harrison et al. | 105/224.1 X |

FOREIGN PATENT DOCUMENTS

| 249735 | 2/1966 | Austria | 105/224.1 |
| 889006 | 9/1953 | Fed. Rep. of Germany | 105/224.1 |
| 1755369 | 12/1971 | Fed. Rep. of Germany | 105/224.1 |
| 2360732 | 6/1975 | Fed. Rep. of Germany | 105/224.1 |
| 2122130 | 8/1972 | France | 105/224.1 |
| 509184 | 8/1971 | Switzerland | 105/224.1 |
| 745020 | 2/1956 | United Kingdom | 105/224.1 |
| 805325 | 12/1956 | United Kingdom | 105/197 A |
| 1161839 | 8/1969 | United Kingdom | 105/224.1 |

Primary Examiner—Randolph A. Reese
Assistant Examiner—Howard Beltran
Attorney, Agent, or Firm—Stevens, Davis, Miller & Mosher

[57] ABSTRACT

A vehicle suspension comprises an axle supported at each end by a respective axle box and respective spring means acting between each axle box and an associated rigid vehicle mounting.

The spring means has an effective spring center which acts at a point between the axle center and the associated axle box so as to reduce the radius of operation of the suspension in a yaw condition as compared with conventional suspensions in which the effective spring center acts at the axle box.

The spring means comprises a pair of spring units arranged one on each side of the axle and each spring unit comprises layers of elastomeric material sandwiched between reinforcement elements.

15 Claims, 3 Drawing Figures

ELASTOMERIC RAILWAY SUSPENSION

This invention concerns improvements in or relating to vehicle axle suspensions and in particular, though not exclusively, to rail vehicle axle suspensions.

The requirement for vehicle axle suspensions to provide sufficient resistance to braking and traction forces in the longitudinal direction of the vehicle effectively limits the minimum allowable longitudinal stiffness for the resilient suspension components.

This causes a problem in the design of rail vehicle axle suspensions where the axle carries two or more fixed wheels which run on fixed rails. In order for the vehicle to traverse a curved track section without undesirable wheel slip occurring it is necessary for the suspension components to be sufficiently compliant in the longitudinal direction to allow the axles to yaw and self-align radially towards the centre of curvature of the track.

Any compromise between these conflicting requirements is governed by the braking and traction requirements which take priority. As a result conventional rail vehicles often suffer from wheel slip especially when negotiating tight curves.

According to the present invention a vehicle axle suspension comprises an axle supported at each end by a respective axle box, respective spring means acting between each axle box and an associated rigid vehicle mounting, each spring means comprising a pair of spring units arranged one each side of the axle in the direction of movement of the vehicle, each spring unit comprising a plurality of layers of elastomeric material interleaved with reinforcing elements, the layers of elastomeric material in each spring unit lying in planes angled relative both to said direction of normal movement and to the direction of the length of the axle so that the effective spring centre of each spring means is displaced in the direction of the length of the axle and acts at a point between the axle centre and the associated axle box.

Yaw stiffness is proportional not only to the longitudinal stiffness of the suspension but also to the square of the radius of operation of the suspension in the yaw condition.

The suspension of the present invention provides a reduction in the yaw stiffness by arranging for the effective spring centre of the spring means provided at each end of the axle to act at a point between the axle centre and the axle box on which the spring means is mounted. As a result the radius of operation of the suspension in the yaw condition, equal to the distance between the axle centre and effective spring centre, is reduced compared with conventional suspensions in which the effective spring centre usually acts at the axle box.

It has been found that the effective spring centre can be displaced towards the axle centre to give reduced yaw stiffness without substantially altering the longitudinal stiffness. Thus wheel-slip can be substantially avoided even when the vehicle is negotiating extremely tight curves without lowering the resistance to braking and traction forces to unacceptable values.

Preferably the layers of elastomeric material in each spring unit lie in planes additionally angled relative to the normal vertical direction, i.e. a direction perpendicular to said direction of normal movement and the direction of the length of the axle, whereby the fatigue life of the spring units under vertical loads is improved.

Each spring unit may comprise a generally rectangular block of rubber layers interleaved with and bonded to rigid metal plates but more preferably each spring unit comprises two such blocks arranged back-to-back to form a spring unit of V-shape in side elevation. The blocks of a V-shape spring unit may be aligned or offset relative to one another i.e. staggered.

Preferably each spring unit is arranged so that the resultant compression stiffness of the spring unit intersects the axle at a point axially inboard of the associated axle box and subtends an angle relative to the length of the axle, preferably an angle in the range 15° to 75°.

The compression stiffness of each spring unit is greater than the sheer stiffness. Preferably the ratio compression stiffness to shear stiffness is at least 2:1 and more preferably 20:1.

Preferably the axle carries a respective fixed wheel adjacent to each end of the axle. Preferably each fixed wheel is mounted axially inboard of the adjacent axle box.

The invention will now be described in more detail, by way of example only, with reference to the accompanying drawing wherein.

Figure 1:
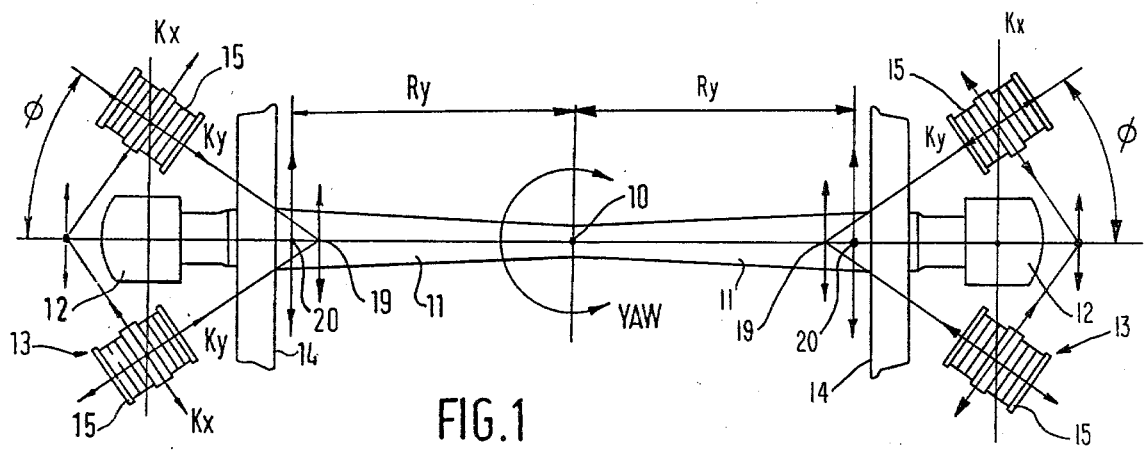
FIG. 1 is a plan view of one half of a rail vehicle axle suspension according to the present invention.
Figure 3:
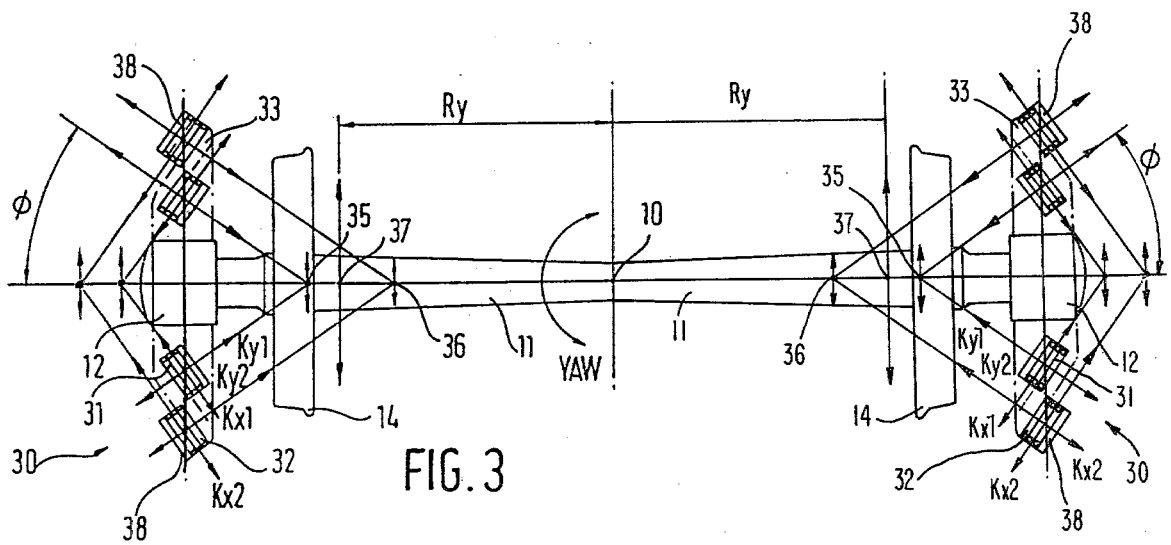
FIG. 3 is a plan view of one half of a second rail vehicle axle suspension according to the present invention.

The vehicle axle suspensions shown in FIGS. 1 and 3 of the accompanying drawing are each symmetrical about the axle centre 10. The following description is therefore restricted to one half of each suspension only, it being understood that the other half is similar to that described.

Figure 2:
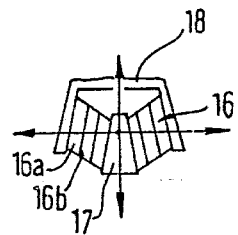
FIG. 2 is a side view of one of the spring units of the suspension shown in FIG. 1.

Referring to FIGS. 1 and 2 there is shown one half of an axle 11 journalled at its outer end in an axle box 12 for rotation relative to a vehicle body (not shown) and spring means 13 acting between the axle box 12 and vehicle body. A wheel 14 fast with the axle 11 is provided axially inboard of the axle box 12 and is profiled to run on a track (not shown).

The spring means 13 comprises two similar spring units 15 positioned one on each side of the axle 11 in the direction of normal movement of the vehicle and arranged each to lie in substantially the same horizontal plane as the axle 11.

Each spring unit 15 is of V-shape in side elevation (FIG. 2) and comprises two aligned spring blocks 16 arranged back-to-back. Each block 16 comprises three rubber layers 16a of equal thickness interleaved with and bonded to two metal plates 16b. Successive rubber layers 16a in each block are arranged in echelon in the unstressed condition of the spring unit. The outer rubber layers of each block 16 are bonded to opposed surfaces of a central wedge-shaped member 17 and an outer channel section member 18. The members 17 and 18 are attached to the axle box 12 and vehicle body respectively.

The spring units 15 are arranged symmetrically about a vertical plane parallel with the length of the axle so that the layers of rubber 16a lie in planes angled relative to both the direction of normal movement of the vehicle and to the length of the axle. The resultant compression stiffness $K_y$ of each spring unit 15 intersects the axle 11 at a point 19 axially inboard of the axle box 12 and subtends an angle $\phi$ relative to the length of the axle 11.

The resultant compression stiffness $K_y$ of each spring unit is greater than the resultant shear stiffness $K_x$.

As a result the effective spring centre of the spring means 13 is displaced along the length of the axle and acts at a point 20 between the axle centre 10 and axle box 12. The distance $R_y$ from the axle centre 10 to the effective spring centre corresponds to the effective radius of operation of the suspension in a yaw condition.

Referring to FIG. 3 there is shown one half of a suspension substantially similar to that described above with reference to FIGS. 1 and 2 except that the spring means 30 comprises a pair of spring units 38 of modified construction. Like reference numerals are used to indicate corresponding parts.

Each spring unit 38 comprises two similar blocks 31,32 arranged back-to-back but offset laterally relative to one another i.e. staggered V-shape in side elevation. The blocks 31,32 are of similar construction to the blocks 16 described previously comprising rubber layers interleaved with and bonded to substantially rigid metal plates. The outer rubber layers of each block 31,32 are bonded to opposed surfaces of a central wedge-shaped member 33 secured to the axle box 12 and a respective mounting (not shown) secured to the vehicle body.

The spring units 38 are arranged symmetrically about a vertical plane parallel with the length of the axle 11 so that the layers of rubber lie in planes angled relative to both the direction of normal movement of the vehicle and to the length of the axle.

The compression stiffnesses $K_{y1}$, $K_{y2}$ of the blocks 31,32 respectively of each spring unit intersect the axle 11 at points 35,36 respectively and subtend an angle $\phi$ relative to the length of the axle. The compression stiffness $K_{y1}$, $K_{y2}$ of the blocks 31,32 respectively are greater than the shear stiffnesses $K_{x1}$, $K_{x2}$.

As a result the effective spring centre of the spring means 13 is displaced along the axle and acts at a point 37 between the axle centre 10 and axle box 12.

In each of the above-described suspensions a reduction in yaw stiffness is obtained by arranging for the effective spring centre of the spring means 13,30 to act at points 20,37 displaced from the axle box 12 towards the axle centre 10.

It will be appreciated that the angle $\phi$ and the ratio compression stiffness $K_y$ to shear stiffness $K_x$ for the spring units 13,30 may be varied to give any desired radius of operation $R_y$.

The invention is not restricted to the above described embodiments which may be modified in a number of ways, for example the number of rubber layers and metal plates forming the blocks 16,31,32 may be varied while the rubber layers may be made of any other suitable elastomeric materials and the plates may be made of materials other than metal, for example textiles. The layers of elastomeric material may be bonded to the metal plates or may be unbonded and engage with inclined or profiled faces of the plates. Each spring means may comprise more than one pair of spring units.

It will also be understood that the invention is not restricted to the above-described types of suspension in which the spring means acts directly between an axle box and the vehicle body but may be utilised in suspensions of the type in which a vehicle body is supported by a bogie having two or more axles rotatably mounted thereon.

A suspension according to the present invention has a radius of operation in the yaw condition such that the axles can self-align radially even for extremely tight curves without reducing the longitudinal stiffness to an unacceptably low value. Futhermore this is achieved without altering the preferred location of the spring means i.e. at the ends of the axle outboard of the fixed wheels.

Having now described my invention what I claim is:

1. A vehicle axle suspension comprising an axle supported at each end by a respective axle box, respective spring means acting between each axle box and an associated rigid vehicle mounting, each spring means comprising a pair of spring units arranged one on each side of said axle in the direction of movement of the vehicle, each spring unit comprising a plurality of layers of elastomeric material interleaved with reinforcing elements, the layers of elastomeric material in each spring unit lying in planes angled relative both to said direction of normal movement and to the direction of the length of said axle wherein the resultant compression stiffness of each spring unit lies in a plane which subtends an acute angle with respect to said axle and intersects said axle at a point between an associated axle box and the center of said axle, so that the effective spring centre of each spring means is displaced along the length of said axle and acts at a point between the axle centre and the associated axle box.

2. A suspension according to claim 1 wherein said spring units of each spring means are arranged symmetrically about a vertical plane coincident with the length of said axle.

3. A suspension according to claim 1 in which said layers of elastomeric material additionally lie in planes angled relative to a direction normal to said direction of movement and said length of said axle.

4. A suspension according to claim 1 in which the resultant compression stiffness of each spring unit is inclined wherein said acute angle is between 15° and 75° relative to the length of said axle.

5. A suspension according to claim 1 in which the elastomeric material is rubber.

6. A suspension according to claim 1 in which a respective fixed wheel is mounted adjacent to each end of said axle axially inboard of the adjacent axle box.

7. A suspension according to claim 1 in which each spring unit comprises a subtantially rectangular block of rubber layers interleaved with and bonded to substantially rigid metal plates.

8. A suspension according to claim 7 in which each spring unit comprises two of said blocks arranged back-to-back to form a spring unit of V-shape in side elevation.

9. A suspension according to claim 8 in which said blocks are aligned where the resultant compression stiffness of said blocks lie in a common plane.

10. A suspension according to claim 8 in which said blocks are staggered.

11. A suspension according to claim 1 in which the resultant compression stiffness of each spring unit is greater than the resultant shear stiffness wherein said combined resultant stiffness therefore intersects said axle along its length at a point between said axle center and said axle box.

12. A suspension according to claim 11 in which the compression stiffness is twice that of the shear stiffness.

13. A suspension according to claim 11 in which the compression is twenty times that of the shear stiffness.

14. A vehicle axle suspension comprising an axle supported at each end by a respective axle box, respective spring means acting between each axle box and an associated rigid vehicle mounting, each spring means comprising a pair of spring units arranged one on each side of said axle in the direction of movement of the vehicle, each spring unit comprising a plurality of layers of elastomeric material interleaved with reinforcing elements, the layers of elastomeric material in each spring unit lying in planes angled relative both to said direction of normal movement and to the direction of the length of said axle, said layers of elastomeric material being inclined at an acute angle relative to the length of said axle whereby the resultant compression stiffness of each spring unit intersects said axle at a point inboard of the associated rigid mounting and between said axle box and the center of said axle and said resultant compression stiffness of each spring unit exceeds the resultant shear stiffness thereof so that the effective spring center of each spring means acts at a point between the axle center and associated axle box.

15. A vehicle axle suspension comprising an axle supported at each end by a respective axle box, respective spring means acting between each axle box and an associated rigid vehicle mounting, each spring means comprising two pairs of springs arranged one on each side of said axle in the direction of normal movement, each spring comprising a plurality of layers of elastomeric material interleaved with reinforcing elements, the layers of elastomeric material in each spring lying in planes angled relative to the direction of normal movement and with respect to the said axle wherein the resultant compression stiffness of each spring lies in a plane which subtends an acute angle relative to the length of the axle and intersects the axle at a point between an associated axle box and the center of said axle and the resultant compression stiffness of each spring exceeds the resultant shear stiffness thereof so that the effective spring center of each spring means acts at a point between the axle center and an associated axle box.

* * * * *